(12) United States Patent
Mason, III et al.

(10) Patent No.: US 10,544,684 B2
(45) Date of Patent: Jan. 28, 2020

(54) INTERIOR COOLING CONFIGURATIONS FOR TURBINE ROTOR BLADES

(71) Applicant: General Electric Company, Schenectady, NY (US)

(72) Inventors: John Rogers Mason, III, Liberty, SC (US); John Lesley DuBose, Greenville, SC (US)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 15/196,453

(22) Filed: Jun. 29, 2016

(65) Prior Publication Data

US 2018/0003061 A1  Jan. 4, 2018

(51) Int. Cl.
*F01D 5/18* (2006.01)

(52) U.S. Cl.
CPC .......... *F01D 5/187* (2013.01); *F05D 2220/32* (2013.01); *F05D 2240/30* (2013.01); *F05D 2260/202* (2013.01); *Y02T 50/673* (2013.01); *Y02T 50/676* (2013.01)

(58) Field of Classification Search
CPC .................................. F01D 5/18; F01D 5/187
See application file for complete search history.

(56) References Cited

U.S. PATENT DOCUMENTS

| | | | |
|---|---|---|---|
| 4,297,077 A * | 10/1981 | Durgin | F01D 5/189 416/97 R |
| 6,939,102 B2 | 9/2005 | Liang | |
| 7,780,413 B2 | 8/2010 | Liang | |
| 7,780,415 B2 | 8/2010 | Liang | |
| 7,901,182 B2 | 3/2011 | Liang | |
| 7,934,906 B2 | 5/2011 | Gu et al. | |
| 8,043,060 B1 | 10/2011 | Liang | |
| 8,061,989 B1 | 11/2011 | Liang | |
| 8,075,268 B1 | 12/2011 | Liang | |
| 8,079,813 B2 | 12/2011 | Liang | |
| 8,096,770 B2 | 1/2012 | Liang | |
| 8,096,771 B2 | 1/2012 | Liang | |
| 8,167,536 B2 | 5/2012 | Liang | |
| 2016/0208622 A1 * | 7/2016 | Ahmad | F01D 5/187 |

* cited by examiner

*Primary Examiner* — Jason D Shanske
*Assistant Examiner* — Brian O Peters
(74) *Attorney, Agent, or Firm* — Frank A. Landgraff; Charlotte C. Wilson; James W. Pemrick

(57) ABSTRACT

A turbine rotor blade that includes an interior cooling configuration having a section configuration that includes: a main channel divided into three non-overlapping segments in which an upstream segment connects to a downstream segment via a transition segment positioned therebetween; and one or more branching channels extending from the main channel via connections each makes to the transition segment. The transition segment includes a variable cross-sectional flow area that accommodates a main channel flow area reduction occurring between the upstream segment and the downstream segment. The one or more branching channels having a total branching channel flow area. The section configuration is configured according to a section channel ratio that is defined as the main channel flow area reduction divided by the total branching channel flow area, with the value of the section channel ratio being configured according a desired coolant flow characteristic.

19 Claims, 8 Drawing Sheets

INTERIOR COOLING CONFIGURATIONS FOR TURBINE ROTOR BLADES

BACKGROUND OF THE INVENTION

This present application relates to cooling hot gas path components in gas turbine engines. More specifically, but not by way of limitation, the present application relates to configurations of interior cooling channels in turbine rotor blades.

Generally, combustion or gas turbine engines (hereinafter "gas turbines") include compressor and turbine sections in which rows of blades are axially stacked in stages. Each stage typically includes a row of circumferentially-spaced stator blades, which are fixed, and a row of rotor blades, which rotate about a central turbine axis or shaft. In operation, generally, the compressor rotor blades are rotated about the shaft, and, acting in concert with the stator blades, compress a flow of air. This supply of compressed air then is used within a combustor to combust a supply of fuel. The resulting flow of hot expanding combustion gases, which is often referred to as working fluid, is then expanded through the turbine section of the engine. Within the turbine, the working fluid is redirected by the stator blades onto the rotor blades so to power rotation. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, so to produce the supply of compressed air needed for combustion, as well as, rotate the coils of a generator so to generate electrical power. During operation, because of the high temperatures, velocity of the working fluid, and rotational velocity of the engine, many of the components within the hot gas path become highly stressed by the resulting mechanical and thermal loads.

Many industrial applications, such as those involving power generation and aviation, still rely heavily on gas turbines, and because of this, the engineering of more efficient engines remains an ongoing and important objective. As will be appreciated, even incremental advances in machine performance, efficiency, or cost-effectiveness are meaningful in the highly competitive markets that have evolved around this technology. While there are several known strategies for improving the efficiency of gas turbines, such as, for example, increasing the size of the engine, filing temperatures, or rotational velocities, each of these generally places additional strain on those already highly stressed hot-gas path components. As a result, there remains a need for improved apparatus, methods or systems that alleviate such operational stresses or, alternatively, that enhance the durability of such components so they may better withstand them.

As will be appreciated, this need is particularly evident in regard to turbine rotor blades, where marketplace competitiveness is exceedingly high and the many design considerations are highly complex and often competing. As such, novel rotor blade designs, such as those presented herein, that succeed in balancing these considerations in ways that optimize or enhance one or more desired performance criteria—while still adequately promoting structural robustness, part-life longevity, cost-effective engine operation, and/or the efficient usage of coolant—represent technological advances having considerable value.

BRIEF DESCRIPTION OF THE INVENTION

The present application thus describes a turbine rotor blade that includes an interior cooling configuration having a section configuration that includes: a main channel divided into three non-overlapping segments in which an upstream segment connects to a downstream segment via a transition segment positioned therebetween; and one or more branching channels extending from the main channel via connections each makes to the transition segment. The transition segment includes a variable cross-sectional flow area that accommodates a main channel flow area reduction occurring between the upstream segment and the downstream segment. The one or more branching channels having a total branching channel flow area. The section configuration is configured according to a section channel ratio that is defined as the main channel flow area reduction divided by the total branching channel flow area, with the value of the section channel ratio being configured according a desired coolant flow characteristic.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
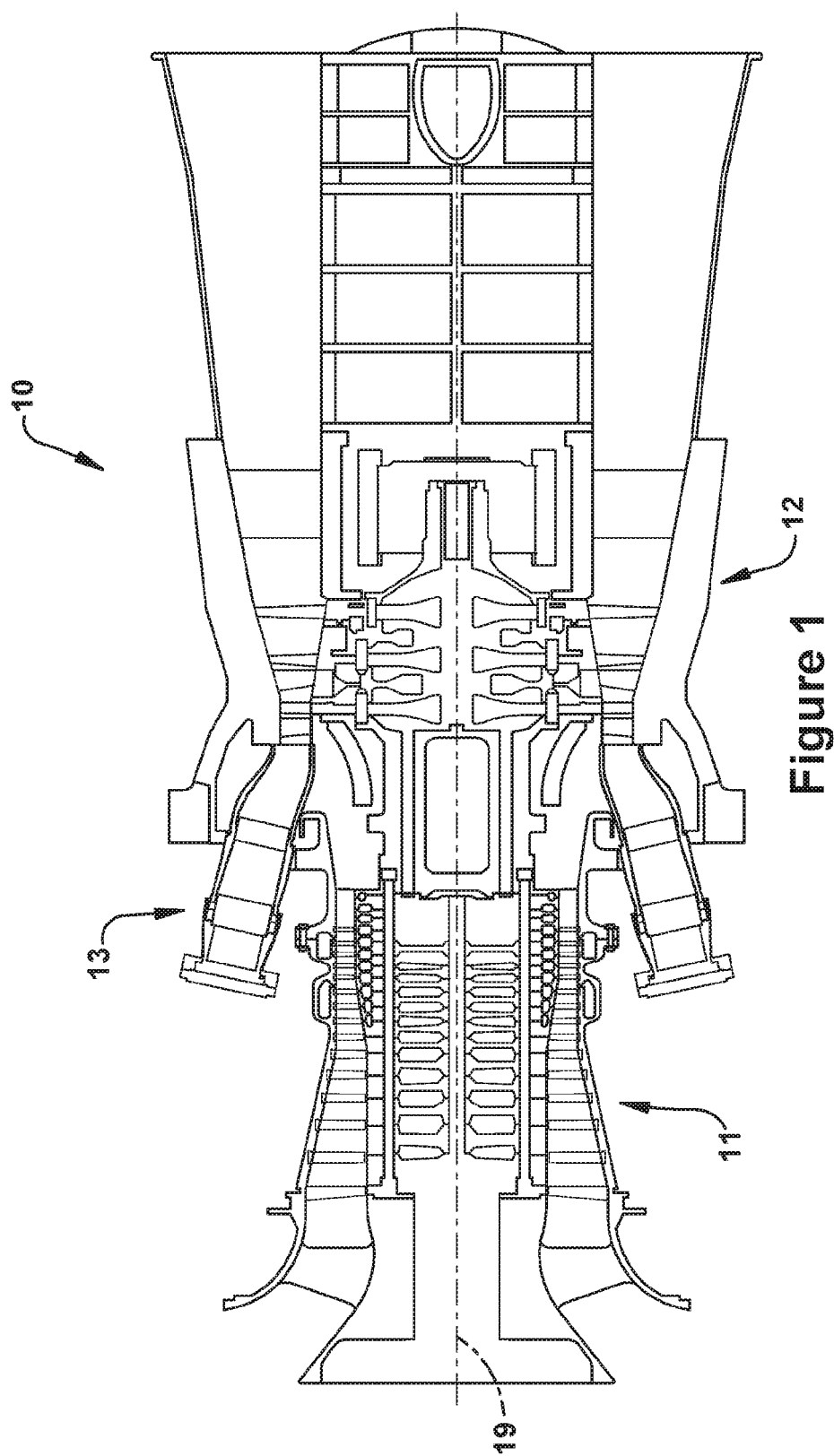
FIG. 1 is a schematic representation of an exemplary gas turbine that may include turbine blades according to aspects and embodiments of the present application.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciate that such terms often are subject to differing interpretations. For example, what may be referred to herein as a single component, may be referenced elsewhere as consisting of multiple components, or, what may be referenced herein as including multiple components, may be referred to elsewhere as being a single component. Thus, in understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would the understood by a person of ordinary skill in the relevant technological arts. Accordingly, it should be understood that, unless otherwise stated, the usage herein of the term "gas turbine" is intended broadly and with limitation as the applicability of the present invention to the various types of turbine engines.

Given the nature of how gas turbines operate, several terms prove particularly useful in describing certain aspects of their function. As will be understood, these terms may be used both in describing or claiming the gas turbine or one of the subsystems thereof—e.g., the compressor, combustor, or turbine—as well as to describe or claim components or subcomponents for usage therewithin. In the latter case, the terminology should be understood as describing those components as they would be upon proper installation and/or function within the gas turbine engine or primary subsystem. These terms and their definitions, unless specifically stated otherwise, are as follows.

The terms "forward" and "aftward" refer to directions relative to the orientation of the gas turbine and, more specifically, the relative positioning of the compressor and turbine sections of the engine. Thus, as used therein, the term "forward" refers to the compressor end while "aftward" refers to the turbine end. It will be appreciated that each of these terms may be used to indicate direction of movement or relative position along the central axis of the engine. As stated above, these terms may be used to describe attributes of the gas turbine or one of its primary subsystems, as well as for components or subcomponents positioned therewithin. Thus, for example, when a component, such as a rotor blade, is described or claimed as having a "forward face", it may be understood as referring to a face that faces toward the forward direction as defined by the orientation of the gas turbine (i.e., the compressor being designated as the forward end and turbine being designated as the aftward end). To take a major subsystem like the turbine as another example (and assuming a typical gas turbine arrangement such as the one shown in FIG. 1), the forward and aftward directions may be defined relative to a forward end of the turbine, at where a working fluid enters the turbine, and an aftward end of the turbine, at where the working fluid exits the turbine.

The terms "downstream" and "upstream" are used herein to indicate position within a specified conduit or flowpath relative to the direction of flow (hereinafter "flow direction") moving through it. Thus, the term "downstream" refers to the direction in which a fluid is flowing through the specified conduit, while "upstream" refers to the direction opposite that. These terms may be construed as referring to the flow direction through the conduit given normal or anticipated operation. As will be appreciated, within the compressor and turbine sections of the gas turbine, the working fluid is directed downstream and through an annularly shaped working fluid flowpath, which is typically defined about the central and common axis of the gas engine. As such, within the compressor and turbine sections of the engine, the term "flow direction", as used herein, refers to a reference direction representing an idealized direction of flow of working fluid through the working fluid flowpath of the engine during an expected or normal condition of operation. Thus, within the compressor and turbine sections, the "flow direction" terminology is referring to flow that is parallel to the central axis of the gas turbine and oriented in the downstream or aftward direction.

Thus, for example, the flow of working fluid through the working fluid flowpath of the gas turbine may be described as beginning as air pressurized through the compressor per the flow direction, becoming combustion gases in the combustor upon being combusted with a fuel, and, finally, being expanded per the flow direction as it passed through the turbine. Likewise, the flow of working fluid may be described as beginning at a forward or upstream location toward a forward or upstream end of the gas turbine, moving generally in a downstream or aftward direction, and, finally, terminating at an aftward or downstream location toward an aftward or downstream end of the gas turbine.

As many components of gas turbines rotate during operation, such as compressor and turbine rotor blades, the terms rotationally lead and rotationally trail may be used to delineate relative positioning of subcomponents or subregions per the expected rotation within the engine. Thus, as will be appreciated, these terms may differentiate position per the direction of rotation (hereinafter "rotation direction") within the compressor or turbine. As used herein, such rotation direction may be understood as being the expected direction of rotation for a component given normal or anticipated operation of the gas turbine.

In addition, given the configuration of gas turbines, particularly the arrangement of the compressor and turbine sections about a common shaft or rotor, as well as the cylindrical configuration common to many combustor types, terms describing position relative to an axis may be regularly used herein. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as being either "radially inward" or "inboard" of the second component. If, on the other hand, the first component resides further from the central axis, the first component will be described as being either "radially outward" or "outboard" of the second component. As used herein, the term "axial" refers to movement or position parallel to an axis, while the term "circumferential" refers to movement or position around an axis. Unless otherwise stated or plainly contextually apparent, these terms should be construed as relating to the central axis of the compressor and/or turbine sections of the gas turbine as defined by the rotor extending through each, even if the terms are describing or claiming attributes of non-integral components—such as rotor or stator blades—that function therein. When otherwise stated, the terms may be used relative to the longitudinal axis of certain components or subsystems within the gas turbine, such as, for example, the longitudinal axis around which conventional cylindrical or "can" combustors are typically arranged.

Finally, the term "rotor blade", without further specificity, is a reference to the rotating blades of either the compressor or the turbine, and so may include both compressor rotor blades and turbine rotor blades. The term "stator blade", without further specificity, is a reference to the stationary blades of either the compressor or the turbine and so may include both compressor stator blades and turbine stator blades. The term "blades" may be used to generally refer to either type of blade. Thus, without further specificity, the term "blades" is inclusive to all type of turbine engine blades, including compressor rotor blades, compressor stator blades, turbine rotor blades, turbine stator blades and the like.

Figure 2:
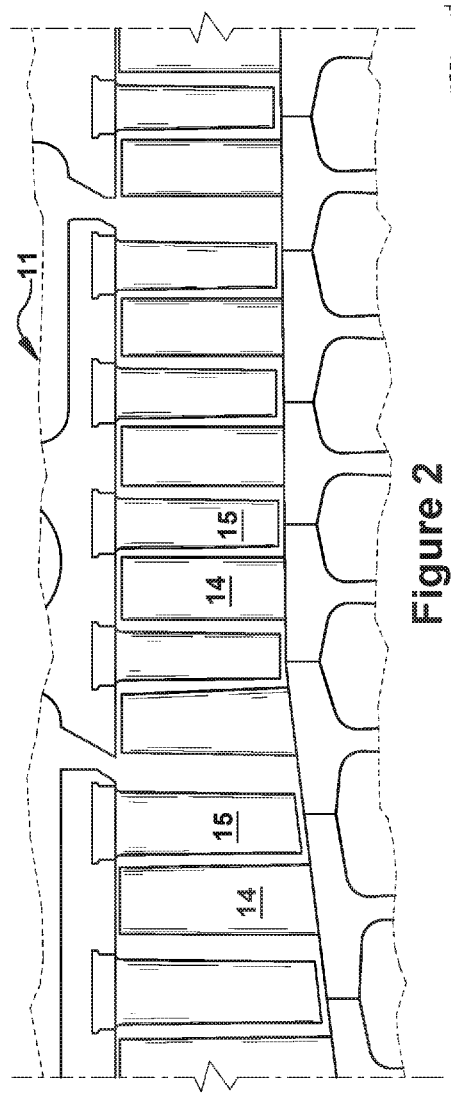
FIG. 2 is a sectional view of the compressor section of the gas turbine of FIG. 1.
Figure 3:
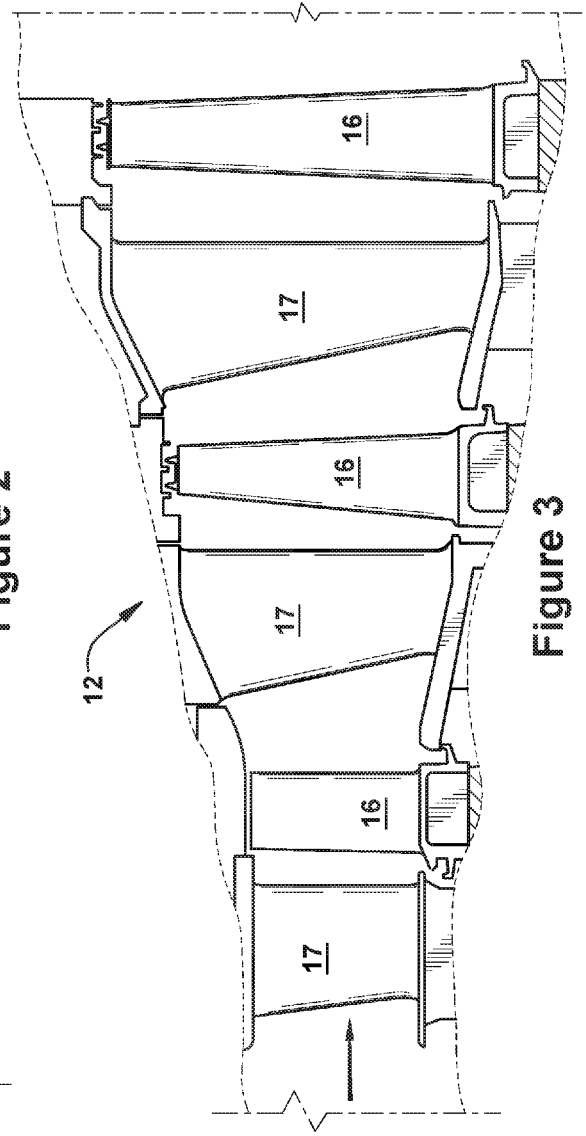
FIG. 3 is a sectional view of the turbine section of the gas turbine of FIG. 1.

By way of background, referring now with specificity to the figures, FIGS. 1 through 3 illustrate an exemplary gas turbine in accordance with the present invention or within which the present invention may be used. It will be understood by those skilled in the art that the present invention may not be limited to this type of usage. As stated, the present invention may be used in gas turbines, such as the engines used in power generation and airplanes, steam turbine engines, as well as other types of rotary engines as would be recognized by one of ordinary skill in the art. The examples provided, thus, are not meant to be limiting unless otherwise stated.

FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 11 that is mechanically coupled by a common shaft or rotor to a downstream turbine section or turbine 12, and a combustor 13 positioned between the compressor 11 and the turbine 12. As illustrated in FIG. 1, the gas turbine may be formed about a common central axis 19.

FIG. 2 illustrates a view of an exemplary multi-staged axial compressor 11 that may be used in the gas turbine of FIG. 1. As shown, the compressor 11 may have a plurality of stages, each of which include a row of compressor rotor blades 14 and a row of compressor stator blades 15. Thus, a first stage may include a row of compressor rotor blades 14, which rotate about a central shaft, followed by a row of compressor stator blades 15, which remain stationary during operation.

FIG. 3 illustrates a partial view of an exemplary turbine section or turbine 12 that may be used in the gas turbine of FIG. 1. The turbine 12 also may include a plurality of stages. Three exemplary stages are illustrated, but more or less may be present. Each stage may include a plurality of turbine nozzles or stator blades 17, which remain stationary during operation, followed by a plurality of turbine buckets or rotor blades 16, which rotate about the shaft during operation. The turbine stator blades 17 generally are circumferentially spaced one from the other and fixed about the axis of rotation to an outer casing. The turbine rotor blades 16 may be mounted on a turbine wheel or rotor disc (not shown) for rotation about a central axis. It will be appreciated that the turbine stator blades 17 and turbine rotor blades 16 lie in the hot gas path or working fluid flowpath through the turbine 12. The direction of flow of the combustion gases or working fluid within the working fluid flowpath is indicated by the arrow.

In one example of operation for the gas turbine 10, the rotation of compressor rotor blades 14 within the axial compressor 11 may compress a flow of air. In the combustor 13, energy may be released when the compressed air is mixed with a fuel and ignited. The resulting flow of hot gases or working fluid from the combustor 13 is then directed over the turbine rotor blades 16, which induces the rotation of the turbine rotor blades 16 about the shaft. In this way, the energy of the flow of working fluid is transformed into the mechanical energy of the rotating blades and, given the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

Figure 4:
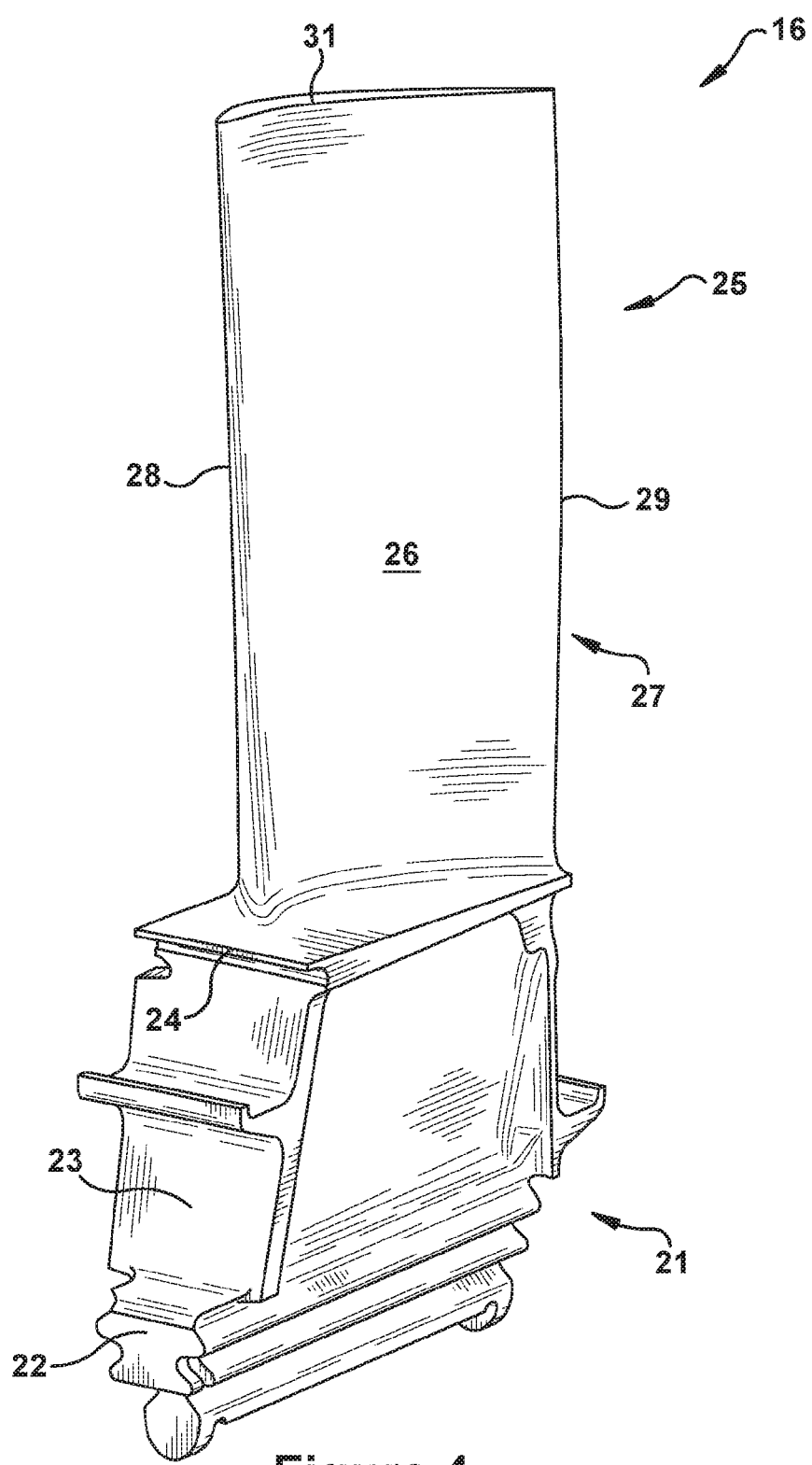
FIG. 4 is a perspective view of an exemplary turbine rotor blade within which interior cooling configurations according to embodiments of the present application may be used.

For background purposes, FIG. 4 provides a perspective view of a turbine rotor blade 16 in accordance with or within which aspects of the present invention may be practiced. As will be appreciated, this figure is provided to illustrate common configurations of rotor blades and delineate spatial relationships between components and regions within such blades for later reference, while also describing geometric constraints and other criteria that affect the internal and external design thereof. While the blade of this example is a rotor blade, it will be appreciated that, unless otherwise stated or specifically limited, the present invention also may be applied to other types of components, such as turbine stator blades, within the gas turbine. As stated above, description of such components may include terminology that derives meaning based on the orientation and function of the gas turbine engine, such as, for example, the orientation of the working fluid flowpath and the flow direction of working fluid therethrough. Thus, where contextually applicable, description related to a rotor or stator blade may be properly understood by assuming the rotor or stator blade is properly installed and functioning within the engine under an anticipated or normal operating conditions.

The rotor blade 16, as illustrated, may include a root 21 that is configured for attaching to a rotor disc. The root 21, for example, may include a dovetail 22 configured for mounting in a corresponding dovetail slot in the perimeter of a rotor disc. The root 21 may further include a shank 23 that extends between the dovetail 22 and a platform 24. The platform 24, as shown, generally forms the junction between the root 21 and an airfoil 25, which is the active component of the rotor blade 16 that intercepts the flow of working fluid through the turbine 12 and induces the desired rotation. The platform 24 may define the inboard end of the airfoil 25. The platform also may define a section of the inboard boundary of the working fluid flowpath through the turbine 12. The airfoil 25 of the rotor blade may typically include a concave pressure face 26 and a circumferentially or laterally opposite convex suction face 27. The pressure face 26 and suction face 27 may extend axially between opposite leading and trailing edges 28, 29, respectively, and, in the radial direction, between an inboard end, which may be defined by the platform 24, and an outboard tip 31. The airfoil 25 may include a curved or contoured shape that is designed for promoting desired aerodynamic performance. As discussed more below, the rotor blade 16 may further include an interior cooling configuration that includes one or more cooling channels through which a coolant is circulated during operation. Such cooling channels may extend radially outward from a connection to a supply source formed through the root 21 of the rotor blade 16. The cooling channels may be linear, curved or a combination thereof, and may include one or more outlet or surface ports through which coolant is exhausted from the rotor blade 16 and into the working fluid flowpath.

Figure 5:
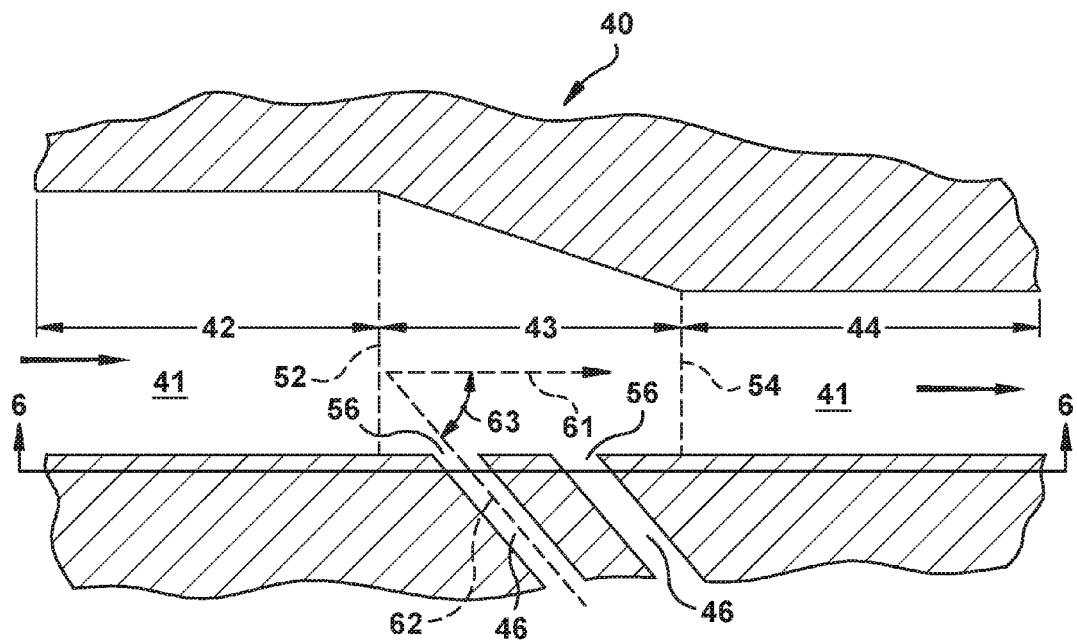
FIG. 5 is a top view of a cooling channel according to an embodiment of the present invention.
Figure 6:
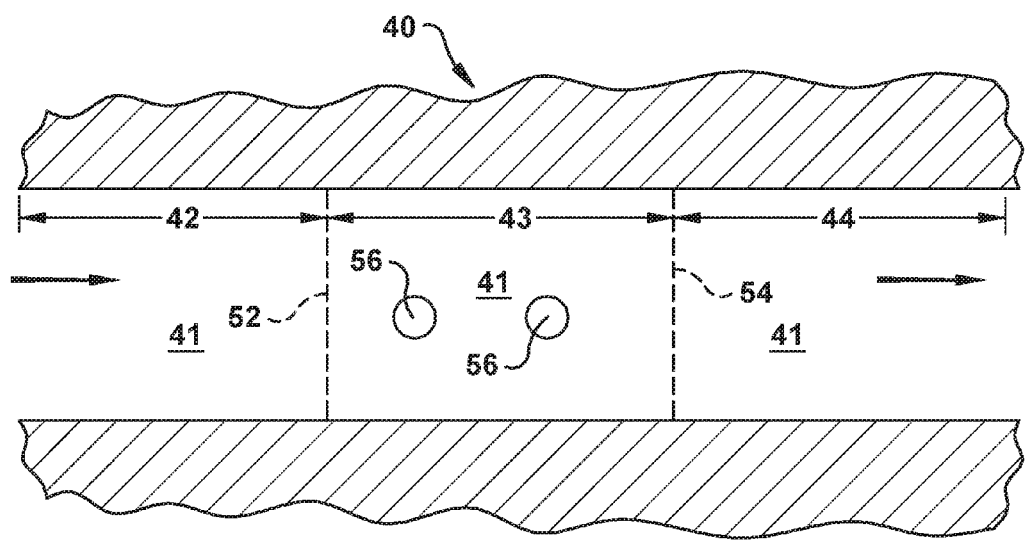
FIG. 6 is a side view along sight line 6-6 of FIG. 5.

FIG. 5 provides a cross-sectional top view of a particular type of cooling channel having a section configuration 40 that is in accordance with embodiments of the present invention, while FIG. 6 show a cross-sectional side view of the section configuration 40 of FIG. 5 along sight line 6-6. As will be seen, the section configuration 40 of the present invention involves a sectional cooling channel configuration that, for example, may be used to promote a substantially constant velocity for the flow of coolant moving through it. As will be seen, this is accomplished by varying the flow area of a main channel relative to the flow area of any of the channels that branch away from it. Thus, according to certain embodiments, the present invention proposes using a narrowing or tapering main channel configuration at locations where coolant flow is diverted into a branching channel so that the overall flow area remains substantially constant. In this manner, the present invention may be used to achieve a substantially constant velocity in the flow of coolant moving through the various channels within this interior cooling configuration.

As will be appreciated, cooling channel configurations that result in flow characteristic of this type may be used to enhance cooling performance within a hot gas path component, such as a rotor blade. This, for example, is because such constant velocity may be used within the interior cooling configuration to promote a balanced and predictable level of coolant flow through the rotor blade. As a result, an intended level of coolant may be delivered to each region of the blade, which may prevent regional overheating so that the increased rate of blade deterioration that attends such "hotspots" is avoided. Additionally, the substantially constant velocity promotes similar heat transfer rates throughout the cooled regions of the component, and this predictability may simplify the design process around such interior cooling configurations. As such design typically is exceedingly complex with many competing design criteria, this simplification may enable more robust and consistently performing interior arrangements. An example of this relates to how the present configuration may promote a balanced relative impact across the various cooled regions within a component in the cases where the pressure of the coolant delivered thereto varies from a prescribed level. Finally, a highly effective interior cooling configuration typically results in less component degradation as well as improved system performance. This later benefit is due to the fact that by using coolant more efficiently, the amount of coolant required to maintain the component is reduced. Since the use of coolant negatively impacts engine efficiency, this reduction may directly translate into improved performance in terms of engine efficiency.

Thus, as provided in FIGS. 5 and 6, an exemplary section configuration 40 according to the present invention is shown which may be employed within an interior cooling channel for actively cooling a hot gas path component, such as a rotor blade. As described below, a plurality of such section configurations 40 may be used within a single component, and each may receive and direct coolant through a particular region of that component. The section configuration 40 may include an axially defined section relative to a longitudinal axis of a cooling channel, wherein that axially defined section includes an upstream end that connects to a coolant source and a downstream end the connects to an outlet. As described herein, the section configuration 40 is described in reference to a main channel 41 that includes three non-overlapping and connecting segments. These segments are axially defined relative to the longitudinal axis of the main channel 41. The segments, as used herein, may include an upstream segment 42, a transition segment 43, and a downstream segment 44, which are defined relative to the direction of coolant flow through the main channel 41. Thus, the upstream segment 42 connects via the transition segment 43 to the downstream segment 44. That is to say, the transition segment 43 is positioned between the upstream segment 42 and the downstream segment 44. As indicated, the upstream segment 42 and the transition segment 43 may connect at an upstream interface 52. According to exemplary embodiments, the cross-sectional flow area of the upstream segment 42 is substantially constant upstream of the upstream interface 52. The downstream segment 44 and the transition segment 43 may connect at a downstream interface 54. According to exemplary embodiments, the cross-sectional flow area of the downstream segment 44 may be substantially constant downstream of the downstream interface 54. As illustrated in FIG. 5, the transition segment 43 may be formed so to have a smoothly narrowing or tapering profile between the upstream interface 52 and the downstream interface 54.

As further shown in FIG. 5, the transition segment 43 may include a variable cross-sectional flow area for accommodating an intended reduction in the cross-sectional flow area of the main channel 41. As used herein, this reduction will be referred to as the "main channel flow area reduction", and, specifically, represents the reduction in the cross-sectional flow area that occurs between the upstream segment 42 and the downstream segment 44. The main channel flow area reduction also may be defined as the difference between the cross-sectional flow area of the upstream interface 52 and the cross-sectional flow area of the downstream interface 54.

The section configuration 40 may further include one or more branching channels 46, each of which extends from the main channel 41 via a connection made thereto within the transition segment 43. Relative to the main channel 41, the branching channels 46 may be significantly smaller in terms of cross-sectional flow area. For example, according to exemplary embodiments, each of the branching channels 46 may have a cross-sectional flow area that is less than half of the cross-sectional flow area of the downstream interface 54 of the main channel 41. According to other embodiments, the branching channels 46 each may have a cross-sectional flow area that is less than a third of the cross-sectional flow area of the downstream interface 54 of the main channel 41. Each of the branching channels 46 may connect to the main channel 41 through an inlet port 56 formed through one of the sidewalls of the transition segment 43. As used herein, the branching channels 46 within the section configuration 40 may have a "total branching channel flow area", which represents the sum of the cross-sectional flow areas for all of the included branching channels 46 within the section configuration 40. The total branching channel flow area also may be defined as the sum of the cross-sectional flow areas of the inlet ports 56 for all the included branching channels 46. Additionally, according to preferred embodiments, each of the one or more branching channels 46 may extend from the main channel 41 at a shallow angle relative to a flow direction defined by the main channel 41 and one defined by the branching channel 46. The flow directions, as indicated in FIG. 5, may be defined by the direction defined by the longitudinal axis through the particular cooling channel. Thus, the flow direction 61 of the main channel 41 may be defined by the longitudinal axis of the main channel 41. Similarly, the flow direction 62 within each of the branching channels 46 may be defined by the longitudinal axis of each. In this manner, each of the branching channels 46 may be described as defining a branching angle 63, which is the angle formed between the flow direction 62 of one of the branching channels 46 and the flow direction 61 of the main channel 41. Though other configurations are also possible, according to one preferred embodiment, the branching angle 63 for each of the branching channels 46 is less than 90 degrees. According to other preferred embodiments, the branching angle 63 for each of the branching channels 46 is less than 60 degrees. As will be appreciated, this type of configuration may be used to improve the aerodynamic performance of the section configuration 40.

According to the present invention, the section configuration 40 may be designed according to a section channel ratio. As used herein, the "section channel ratio" for the section configuration 40 is the ratio between aforementioned "main channel flow area reduction" and "total branching channel flow area". Specifically, as used herein, the "section channel ratio" is defined as the main channel flow area reduction divided by the total branching channel flow area. According to embodiments of the present invention, this section channel ratio comprises a predetermined value that is chosen to promote a desired coolant flow characteristic within the section configuration 40 during operation. As stated, according to exemplary embodiments, this desired flow characteristic relates to a flow velocity for the coolant passing through the section configuration 40. Specifically, it relates to maintaining a substantially constant coolant flow velocity through the main channel 41 and the one or more branching channels 46. According to exemplary embodiments, the section channel ratio is such so that the additional flow area defined by the branching channels 46 is offset or balanced by a commiserate narrowing of main channel 41. Thus, according to exemplary embodiments, the cool channel ratio may between approximately 0.8 and 1.2. It has been discovered by the present applicants that this range of values may be used to induce a substantially constant velocity over a range of cooling channel geometries. More preferably, according to other embodiments, the predetermined value for the section channel ratio may be between approximately 0.9 and 1.1. According to certain preferred embodiments, the predetermined value for the section channel ratio may be exactly or substantially 1.0. According to other embodiments of the present invention, the predetermined value for the section channel ratio may be slightly less than one, for example, between approximately 0.8 and 1.0. This may be desirable, for example, to account for pressure losses while still maintaining a substantially constant coolant flow velocity. According to still other embodiments of the present invention, the predetermined value for the section channel ratio may be slightly more than one, for example, between approximately 1.0 and 1.2. This may be desirable, for example, to counter the effect that of rising coolant temperatures have on flow velocity. As will be appreciated, as coolant moves through the section configuration 40, the heat absorbed by the coolant may cause expansion significant enough to materially increase flow velocity. Where such effects are considerable and it is otherwise desirable, this effect may be substantially nullified by setting the section channel ratio at a value greater than one.

With particular reference now to FIGS. 7 through 10, examples are provided showing ways in which the section configuration 40 described in FIGS. 5 and 6 may be used to cool the interior of turbine rotor blade airfoils. It should be understood that, whether explicitly shown or not, the following exemplary uses may be modified to include any of the various alternative configurations that were discussed in relation to FIGS. 5 and 6. As will be seen, FIGS. 7 and 8 focus on an exemplary embodiment in which a radially oriented or radially extending cooling channel 70 is configured to include the section configuration 40, while FIGS. 9 and 10 relates to an example in which the section configuration 40 is formed within an axially oriented or axially extending cooling channel 80. Accordingly, it should be understood that a plurality of the section configurations 40 may be used within a single internally cooled component, such as the rotor blade airfoil of the present example, and, further, that those section configurations 40 may be linked in serial or parallel as part of a connected network cooling channels that covers the entirety of the airfoil or only a subregion thereof. In such cases, for example, a continuous cooling channel may serve as a "main channel" for multiple instances of the section configurations 40 that are disposed along that channels length. According to an alternative example, a continuous cooling channel may serve as a "branching channel" relative to a first instance of the section configuration 40 and then serve as a "main channel" relative to the second instance of the section configuration 40. Other possible examples will become apparent as these examples are described.

Figure 7:
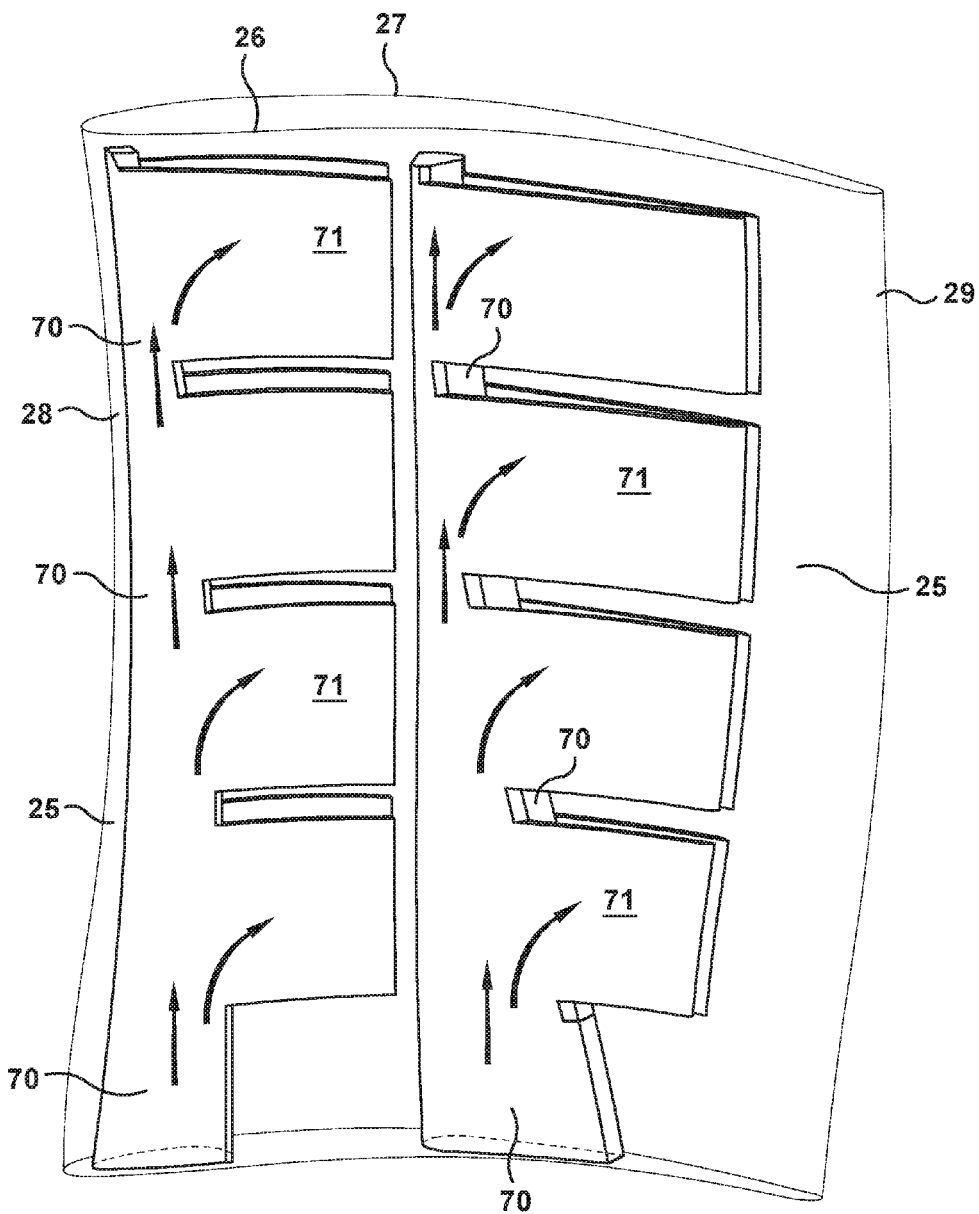
FIG. 7 is a transparent side view illustrating an interior cooling configuration for a turbine rotor blade airfoil in accordance with embodiments of the present invention.
Figure 8:
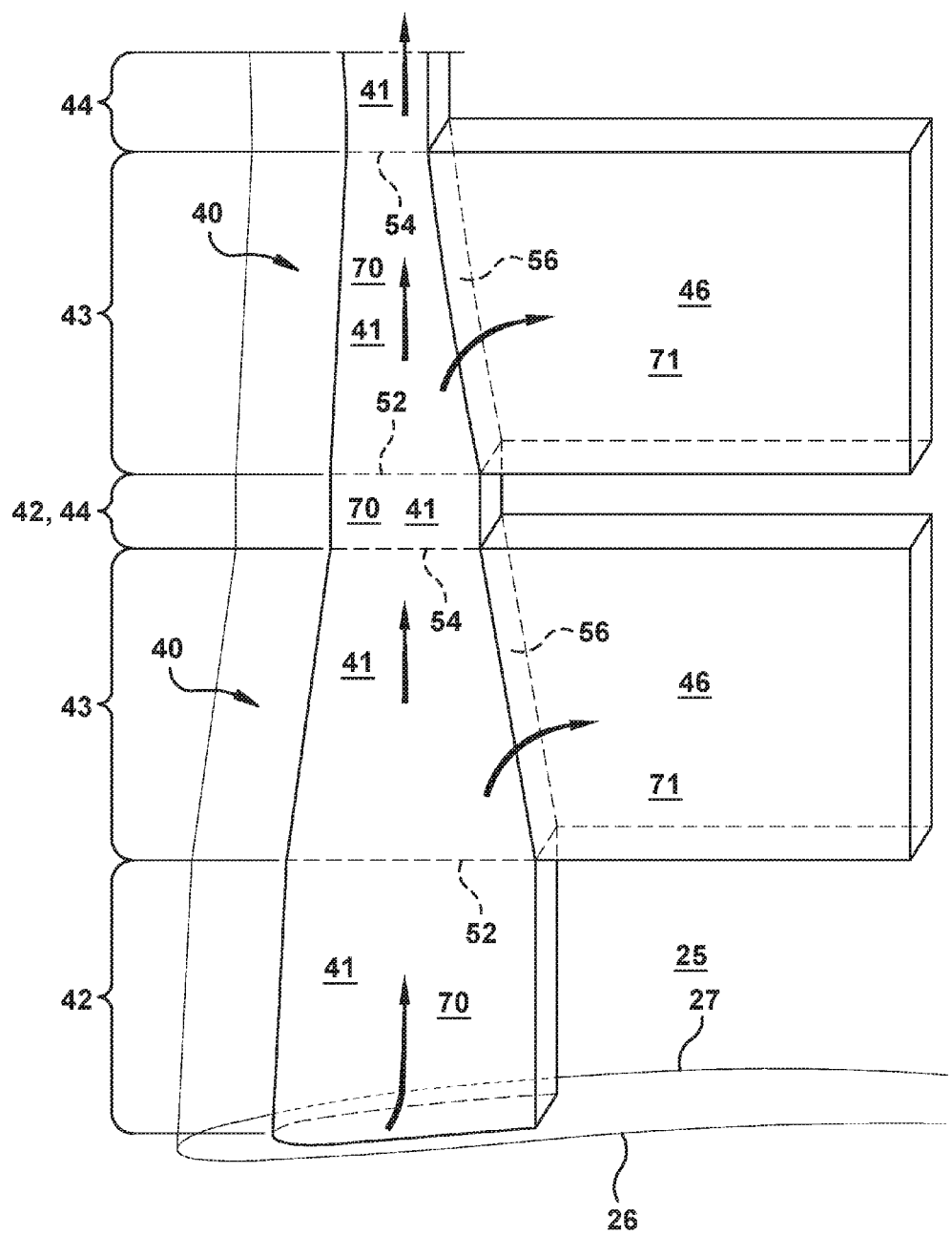
FIG. 8 is an transparent side view emphasizing a particular region of the interior cooling configuration of FIG. 7.
Figure 9:
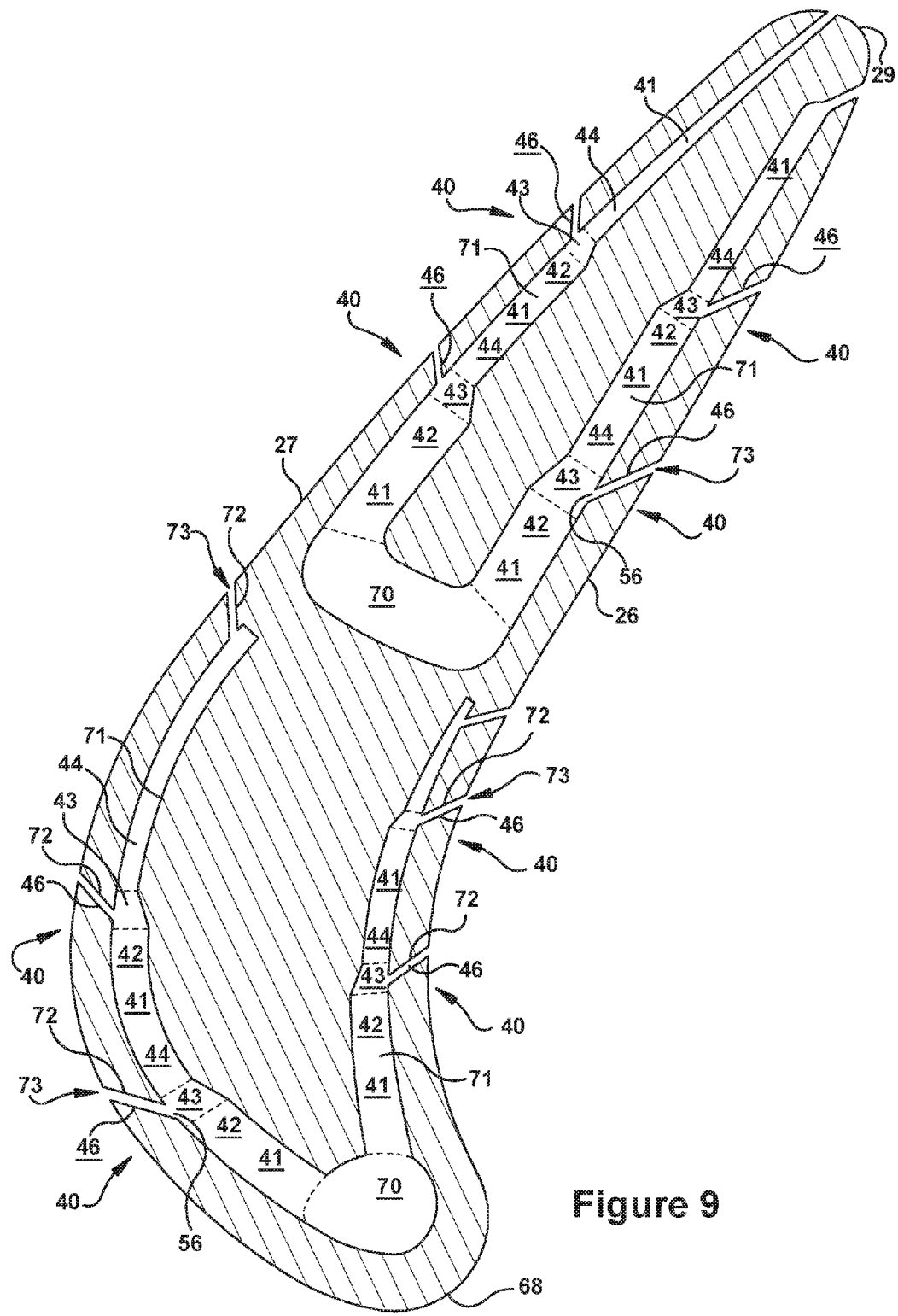
FIG. 9 is a cross-sectional top view illustrating an interior cooling configuration for a turbine rotor blade airfoil in accordance with embodiments of the present invention.
Figure 10:
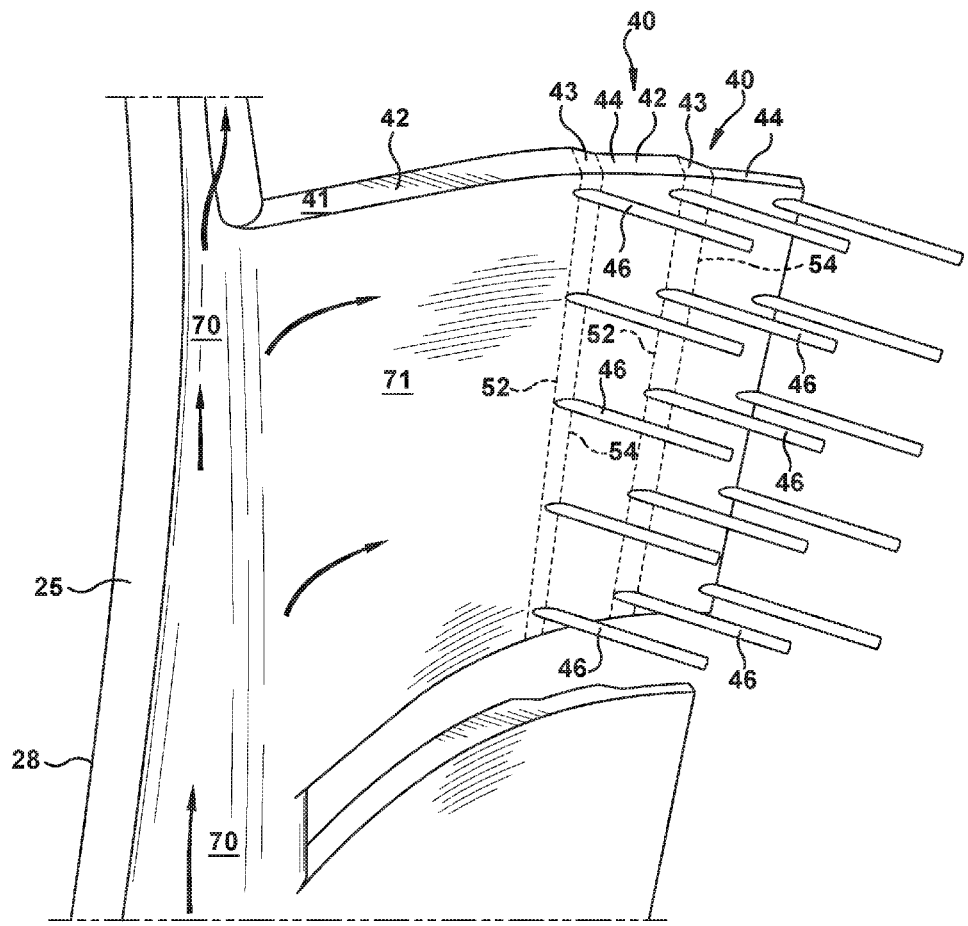
FIG. 10 is transparent perspective view emphasizing a particular region of the interior cooling configuration of FIG. 9.

Turning now to FIG. 7, a turbine blade airfoil 25 is shown in a transparent perspective view so to emphasize a preferred interior cooling configuration in which, as detailed in FIGS. 8 through 10, one or more of the section configurations 40 may be used to enhance overall cooling performance. As indicated, the interior cooling configuration within the airfoil may include radially extending channels 70, which are longitudinally oriented in the approximately radial direction, and, branching therefrom, axially extending channels 71, which are longitudinally oriented in the approximately axial direction. Though other configurations are also possible, the example shown includes two of the radially extending channels 70, one positioned toward the leading edge 28 of the airfoil 25 and the other positioned toward the trailing edge 29 of the airfoil 25, and, then, extending from each of these, radially stacked instances of the axially extending channels 71. As will be seen, particularly in relation to FIG. 10, the axially extending channels 71 may also be a circumferentially stacked, in that the axially extending channels 71 may include separate ones that are offset from each of the pressure side 26 and the suction side 27 of the airfoil 25. As will be appreciated, each of the axially extending channels 71 may include a connection formed through the root 21 of the rotor blade 16 by which it connects to a coolant source. As indicated by the several arrows, coolant may enter each of the radially extending channels 70 at the inboard end of the airfoil 25 and flow and generally in the outboard direction, and, in doing so, feed coolant to each of the axially extending channels 71 that branch therefrom. Other interior cooling channels may be included, as will be seen in the following figures.

FIG. 8 provides an enhanced view of a portion of the cooling channel configuration of FIG. 7, and demonstrates how the section configuration 40 may be implemented relative to the radially extending channels 70 and the axially extending channels 71. It should be understood that although only a portion of the cooling channel configuration of FIG. 7 is shown, the section configuration 40 may also be used in the other regions of the airfoil 25 in ways similar to those of the present example. As indicated, the radially extending channel 70 may form a main channel 41 for each of the two radially stacked instances of the section configuration 40 that are shown. For each of these section configurations 40, the three non-overlapping segments are indicated. Thus, an upstream segment 42, a transition segment 43, and a downstream segment 44 are identified, with the dotted lines between them indicating the upstream and downstream interfaces 52, 54 that separate them. As will be appreciated, the downstream segment 44 of the inboard most section configuration 40 also serves as the upstream segment 42 of the outboard most section configuration 40. The two axially extending channels 71 serve as the branching channels 46 for the section configurations 40. In FIG. 8, only a single branching channel 46 is visible for each of the radially stacked section configurations 40. As illustrated most clearly in FIG. 9, two such branching channels 46 may be provided on each side of the airfoil 25. In such cases, one of the branching channels 46 may be described as being circumferentially stacked due to face that one of the branching channels 46 is offset from and near the pressure side 27 of the airfoil 25, while the other one of the branching channels is offset from and near the suction side 26 of the airfoil 25. The total branching channel flow area is the sum of the cross-sectional flow areas of the respective one or more inlet ports 56 of the one or more branching channels 46 included in each of the section configurations 40.

In accordance with the concepts discussed in relation to FIGS. 5 and 6, the main channel flow area reduction (i.e., the difference between the cross-sectional flow area of the upstream interface 52 and the cross-sectional flow area of the downstream interface 54) may be configured so to desirably compensate for the total branching channel flow area (i.e., the total cross-sectional flow area of the inlet ports 56 of the corresponding one or more branching channels 46 within each of the section configurations 40). This, as already described, may be achieved by configuring the section configuration 40 to have a particular predetermined section channel ratio, as previously defined, which, for example, corresponds with a desired coolant flow characteristic through the section configuration 40. For example, according to one possible embodiment, the section configurations 40 of FIG. 8 may be configured so that the value of the section channel ratio for each is between approximately 0.8 and 1.2. As stated, this type of configuration may be used to induce a constant coolant flow velocity through the section configurations 40. Other values for the section channel ratio are also possible, the preferred ranges of which are discussed in relation to FIGS. 5 and 6.

FIGS. 9 and 10 provide enhanced views of a different portion of the cooling channel configuration of FIG. 7, and demonstrate how the section configuration 40 of the present invention may be implemented relative to the axially extending channels 71 and several surface channels 72 (not previously shown), which are the smaller channels that are depicted as branching from the axially extending channels 71 to outlet ports 73 formed on an outer surface of the airfoil 25. As shown, the axially extending channels 71 may be formed on each side of the airfoil 25, and may be used as the main channel 41 relative to the axially stacked instances of the section configuration 40. Thus, as illustrated, the axially extending channels 71 form the main channel 41 while a plurality of the surface channels 72 that extend therefrom serves as the branching channels 46 in each of the section configurations 40 of FIGS. 9 and 10. As will be appreciated, for each of these main channels 41, the three non-overlapping segments are indicated, i.e., the upstream segment 42, the transition segment 43, and the downstream segment 44. Additionally, dotted lines are provided to indicate the upstream and downstream interfaces 52, 54 that separate the segments within each of the section configurations 40. As illustrated, according to a preferred embodiment, the transition segment 43 of the axially extending channels 71 is configured such that the narrowing occurs in the circumferential direction. As further illustrated, this circumferential narrowing may occur on the far side of the axially extending channel 71, which, as used herein, is the side facing away or farthest from the nearest airfoil surface. In this way, a constant offset between the axially extending channel 71 and the airfoil surface is maintained through the transition segments 43 of the section configurations 40, which is a configuration that may improve cooling effectiveness. According to other embodiments, the transition segment 43 of the axially extending channels 71 may be configured such that the narrowing occurs in the radial direction. However, as will be appreciated, such configurations may limit the radial height of the axially extending channel 71 as it extends in the axial direction, which may limit coverage.

As should be understood given the depictions of the embodiments of FIGS. 7 through 10, when an interior cooling configuration within a component includes more than one of the section configurations 40 and these section configurations 40 are connected, it is possible for the same cooling channel to serve different channel functions within each of occurring section configurations 40. Thus, for example, an axially extending channel 71 may serve as a branching channel 46 relative to a first section configuration 40, as is the case with the section configuration 40 discussed in relation to FIG. 8, while also serving as a main channel 41 relative to a second section configuration 40, as is the case with the section configuration 40 discussed in relation to FIG. 9.

Returning to the examples shown in FIGS. 9 and 10, the various surface channels 72 may serve as the branching channels 46 for each of the illustrated section configurations 40. Since there is multiple branching channels 46 included within each of the provided section configurations 40, the total branching channel flow area may be calculated as the sum of the cross-sectional flow areas of the inlet ports 56 that correspond to those multiple branching channels 46. Thus, in accordance with the concepts discussed in relation to FIGS. 5 and 6, the main channel flow area reduction (i.e., the difference between the cross-sectional flow area of the upstream interface 52 and the cross-sectional flow area of the downstream interface 54) may be configured so to desirably compensate for the total branching channel flow area (i.e., the total cross-sectional flow area of the inlet ports 56 of the branching channels 46 within each of the section configurations 40). This, as already described, may be achieved by configuring the section configuration 40 to have a particular predetermined section channel ratio, as previously defined, which, for example, corresponds with a desired coolant flow characteristic. For example, according to one possible embodiment, the section configurations 40 of FIGS. 9 and 10 may be configured so that the value of the section channel ratio for each is between approximately 0.9 and 1.1. As stated, this type of configuration may be used to induce a constant coolant flow velocity through the section configuration 40. Other values for the section channel ratio are also possible, the preferred ranges of which are discussed in relation to FIGS. 5 and 6.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the present application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A rotor blade for use in a turbine of a gas turbine that includes:
    an airfoil defined between a concave pressure face and a laterally opposed convex suction face, wherein the pressure face and the suction face extend axially between opposite leading and trailing edges and radially between an outboard tip and an inboard end that attaches to a root configured to couple the rotor blade to a rotor disc; an interior cooling configuration that includes one or more cooling channels for receiving and directing a coolant through an interior of the rotor blade, wherein the one or more cooling channel includes a section configuration that comprises:
    a main channel divided into three non-overlapping segments in which an upstream segment connects to a downstream segment via a transition segment positioned therebetween, wherein the transition segment comprising a variable cross-sectional flow area that accommodates a main channel flow area reduction occurring between the upstream segment and the downstream segment; and
    one or more branching channels extending from the main channel via connections each of the one or more branching channels makes to the transition segment, wherein the one or more branching channels comprise a total branching channel flow area;
    wherein the section configuration comprises a section channel ratio indicating the main channel flow area reduction divided by the total branching channel flow area;
    wherein the section channel ratio comprises a predetermined value that relates to a desired flow characteristic for the coolant moving through the section configuration during operation and the predetermined value for the section channel ratio is between 0.8 and 1.2.

2. The rotor blade according to claim 1, wherein the desired flow characteristic comprises a velocity of the coolant through the section configuration during operation;
    wherein at least one of the one or more cooling channels of the section configuration is continuous between: an upstream end that fluidly communicates with a supply connector formed through the root of the rotor blade to connect to a coolant source; and a downstream end that fluidly communicates with an outlet port formed on an outer surface of the airfoil.

3. The rotor blade according to claim 2, wherein a cross-sectional flow area of the upstream segment is substantially constant;
    wherein a cross-sectional flow area of the downstream segment is substantially constant;
    wherein the predetermined value for the section channel ratio is between 0.9 and 1.1.

4. The rotor blade according to claim 3, wherein the upstream segment and the transition segment connect at an upstream interface;
    wherein the downstream segment and the transition segment connect at a downstream interface;
    wherein the main channel flow area reduction equals a difference between a cross-sectional flow area of the upstream interface and a cross-sectional flow area of the downstream interface;
    wherein each of the one or more branching channels connects to the main channel through an inlet port formed through a sidewall of the transition segment;
    wherein the total branching channel flow area equals a sum of cross-sectional flow areas of the inlet ports for each of the one or more branching channels.

5. The rotor blade according to claim 4, wherein the transition segment comprises a smoothly narrowing profile between the upstream interface and the downstream interface;
    wherein each of the inlet ports of the one or more branching channels comprises a cross-sectional flow area that is less than a half of the cross-sectional flow area of the downstream interface;
    wherein a flow direction of each of the one or more branching channels deviates from a flow direction of the main channel according to a branching angle formed therebetween, wherein each of the branching angles of the one or more branching channels is less than 90 degrees.

6. The rotor blade according to claim 5, wherein the one or more cooling channels includes a plurality of the section configurations, including at least a first section configuration that fluidly communicates with and resides upstream of a second section configuration;
    wherein the first section configuration and the second section configuration are radially stacked such that:
        the one or more cooling channels on which the main channel of the first section configuration is formed comprises a radially extending cooling channel; and
        the one or more cooling channels on which the main channel of the second section configuration is formed comprise the radially extending cooling channel.

7. The rotor blade according to claim 6, wherein the one or more branching channels for the first section configuration comprises a first axially extending channel;
    wherein the one or more branching channels for the second section configuration comprises a second axially extending channel;

wherein the first axially extending channel is positioned inboard of the second axially extending channel.

8. The rotor blade according to claim 7, wherein at least a portion of the downstream segment of the first section configuration overlaps with a portion of the upstream segment of the second section configuration.

9. The rotor blade according to claim 4, wherein the transition segment comprises a smoothly narrowing profile between the upstream interface and the downstream interface;
wherein each of the inlet ports of the one or more branching channels comprises a cross-sectional flow area that is less than a third of the cross-sectional flow area of the downstream interface;
wherein the main channel comprises a longitudinal axis that defines the flow direction therethrough;
wherein each of the one or more branching channels comprises a longitudinal axis that defines the flow direction therethrough;
wherein the flow direction of each of the one or more branching channels deviates from the flow direction of the main channel according to a branching angle formed therebetween, wherein the branching angle of each of the one or more branching channels is less than 60 degrees.

10. The rotor blade according to claim 3, wherein the one or more cooling channels includes a plurality of the section configurations, including at least a first section configuration that fluidly communicates with and resides upstream of a second section configuration;
wherein the first section configuration and the second section configuration are axially stacked such that:
the one or more cooling channels on which the main channel of the first section configuration is formed comprises an axially extending cooling channel; and
the one or more cooling channels on which the main channel of the second section configuration is formed comprises the axially extending cooling channel.

11. The rotor blade according to claim 10, wherein the one or more branching channels for each of the first section configuration and the second section configurations comprises surface channels, each of which connects to an outlet port formed on the outer surface of the airfoil;
wherein the transition section of the first section configuration is configured such that a narrowing related to the main channel flow area reduction occurs in the circumferential direction;
wherein the transition section of the second section configuration is configured such that a narrowing related to the main channel flow area reduction occurs in the circumferential direction.

12. The rotor blade according to claim 3, wherein the one or more cooling channels includes a plurality of the section configurations, including at least a first section configuration that fluidly communicates with and resides upstream of a second section configuration;
wherein the one or more cooling channels on which the main channel of the first section configuration is formed comprises a radially extending cooling channel;
wherein the one or more branching channels of the first section configuration comprises an axially extending cooling channel;
wherein the one or more cooling channels on which the main channel of the second section configuration is formed comprises the axially extending cooling channel;

wherein the one or more branching channels for the second section configurations comprises surface channels, each of which connects to an outlet port formed on the outer surface of the airfoil.

13. The rotor blade according to claim 3, wherein the one or more cooling channels includes a plurality of the section configurations, including at least a first section configuration and a second section configuration;
wherein the first section configuration and the second section configuration are circumferentially stacked such that:
the main channel of the first section configuration is disposed in proximity to and offset from the pressure side of the airfoil; and
the main channel of the second section configuration is disposed in proximity to and offset from the suction side of the airfoil.

14. The rotor blade according to claim 3, wherein the one or more cooling channels includes a plurality of the section configurations, including at least:
a first section configuration and a second section configuration that are radially stacked in relation to each other;
a third section configuration and a forth section configuration that are axially stacked in relation to each other; and
a fifth section configuration and a sixth section configuration that are circumferentially stacked in relation to each other.

15. The rotor blade according to claim 2, wherein the predetermined value for the section channel ratio is between 0.8 and 1.0.

16. The rotor blade according to claim 2, wherein the predetermined value for the section channel ratio is between 1.0 and 1.2.

17. The rotor blade according to claim 2, wherein the upstream segment and the transition segment connect at an upstream interface;
wherein the downstream segment and the transition segment connect at a downstream interface;
wherein the main channel flow area reduction equals a difference between a cross-sectional flow area of the upstream interface and a cross-sectional flow area of the downstream interface;
wherein the total branching channel flow area equals a sum of cross-sectional flow areas for all of the one or more branching channels;
wherein the predetermined value for the section channel ratio is exactly 1.0.

18. A gas turbine comprising a turbine and, within the turbine, a row of rotor blades, wherein each of the rotor blades within the row of rotor blade includes: an airfoil defined between a concave pressure face and a laterally opposed convex suction face, wherein the pressure face and the suction face extend axially between opposite leading and trailing edges and radially between an outboard tip and an inboard end that attaches to a root configured to couple the rotor blade to a rotor disc; an interior cooling configuration that includes one or more cooling channels for receiving and directing a coolant through an interior of the rotor blade, wherein the one or more cooling channel includes a section configuration that comprises: a main channel divided into three non-overlapping segments in which an upstream segment connects to a downstream segment via a transition segment positioned therebetween, wherein the transition segment comprising a variable cross-sectional flow area that accommodates a main channel flow area reduction occurring between the upstream segment and the downstream segment; and one or more branching channels extending from the main channel via connections each of the one or more branching channels makes to the transition segment, wherein the one or more branching channels comprise a total branching channel flow area; and a section channel ratio that comprises a value of between 0.8 and 1.2, wherein the section channel ratio is the main channel flow area reduction divided by the total branching channel flow area.

19. The gas turbine according to claim 18, wherein the transition segment comprises a smoothly narrowing profile between the upstream interface and the downstream interface;

wherein at least one of the one or more cooling channels of the section configuration is continuous between: an upstream end that fluidly communicates with a supply connector formed through the root of the rotor blade to connect to a coolant source; and a downstream end that fluidly communicates with an outlet port formed on an outer surface of the airfoil;

wherein a cross-sectional flow area of the upstream segment is substantially constant;

wherein a cross-sectional flow area of the downstream segment is substantially constant;

wherein the predetermined value for the section channel ratio is exactly 1.0.

* * * * *